United States Patent [19]
Yamamoto et al.

[11] Patent Number: 5,349,430
[45] Date of Patent: Sep. 20, 1994

[54] RADAR APPARATUS FOR A VEHICLE

[75] Inventors: Kouji Yamamoto; Makoto Yamanoi; Hirokazu Endo; Kimiaki Ishikawa, all of Shizuoka, Japan

[73] Assignee: Koito Manufacturing Co., Ltd., Tokyo, Japan

[21] Appl. No.: 38,640

[22] Filed: Mar. 29, 1993

[30] Foreign Application Priority Data

Mar. 31, 1992 [JP] Japan .................... 4-104103

[51] Int. Cl.$^5$ .................. G01C 3/08; B60T 7/16; B62D 1/24
[52] U.S. Cl. ............................. 356/5; 180/167; 180/169; 340/903
[58] Field of Search ............... 180/169, 167; 356/4, 356/5; 340/903; 342/70, 71, 72; 367/96

[56] References Cited

U.S. PATENT DOCUMENTS

| | | | |
|---|---|---|---|
| 3,572,928 | 3/1971 | Decker et al. | 356/4 |
| 3,898,652 | 8/1975 | Rashid . | |
| 4,168,499 | 9/1979 | Matsumura | 180/272 |
| 4,587,522 | 5/1986 | Warren | 340/902 |
| 4,868,916 | 9/1989 | Ablov et al. | 340/970 |
| 4,926,170 | 5/1990 | Beggs et al. | 340/904 |
| 4,992,943 | 2/1991 | McCracken . | |
| 5,202,684 | 4/1993 | Funatsu | 340/961 |

FOREIGN PATENT DOCUMENTS

| | | |
|---|---|---|
| 464821 | 7/1991 | European Pat. Off. . |
| 498524 | 1/1992 | European Pat. Off. . |

Primary Examiner—Stephen C. Buczinski
Attorney, Agent, or Firm—Sughrue, Mion, Zinn, Macpeak & Seas

[57] ABSTRACT

A laser type radar apparatus which inhibits a first alarm at least for a predetermined time period from the pausing of the second alarm.

18 Claims, 3 Drawing Sheets

FIG. 1 PRIOR ART
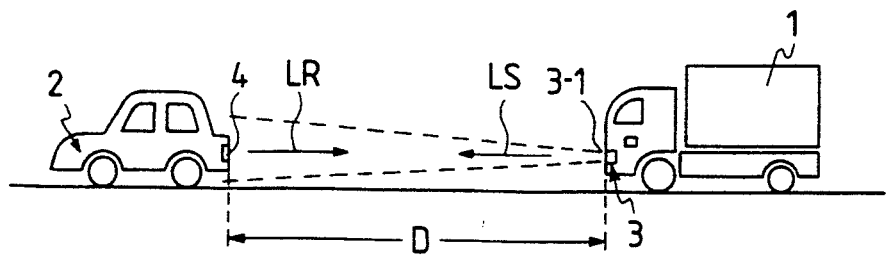
FIG. 2 PRIOR ART
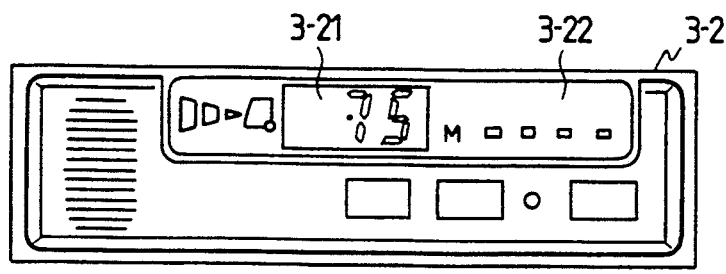
FIG. 3A PRIOR ART
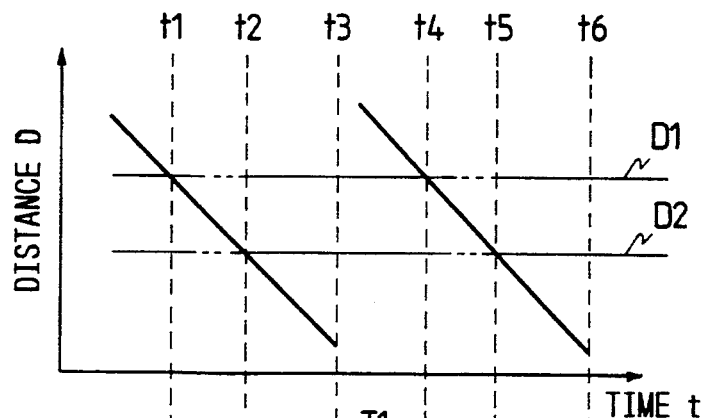
FIG. 3B PRIOR ART
FIG. 3C PRIOR ART
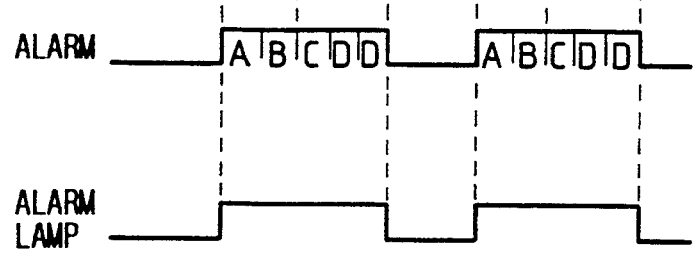

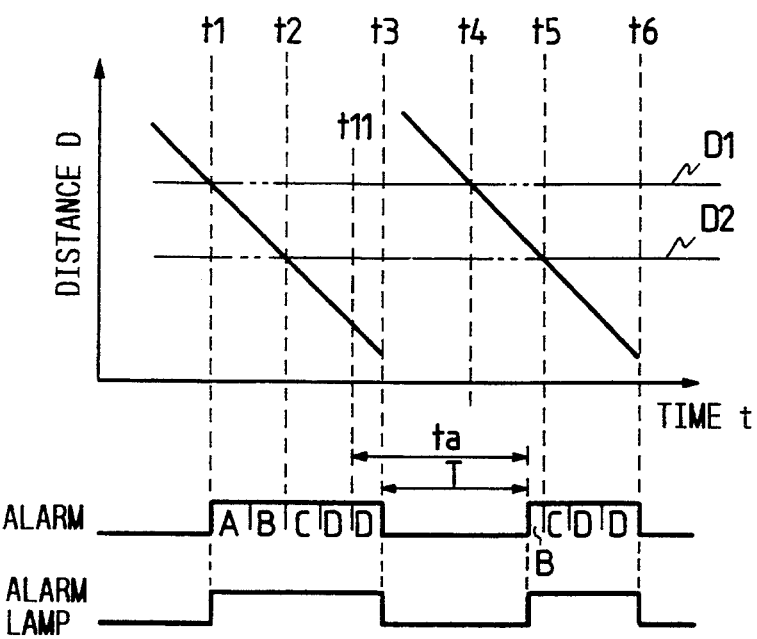
FIG. 4A
FIG. 4B
FIG. 4C
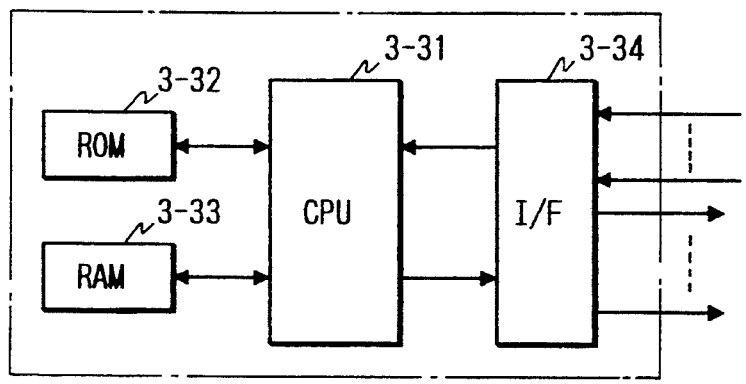
FIG. 5

RADAR APPARATUS FOR A VEHICLE

BACKGROUND OF THE INVENTION

FIELD OF THE INVENTION

The present invention relates to a radar apparatus for use in an automobile which measures a distance from an object located forward of the vehicle in the same traffic lane, and generates a first alarm if the distance is shorter than a first alarm distance and a second alarm when the distance becomes shorter than a second alarm distance.

Recently, some types of radar apparatus for use in an automobile have been proposed to avoid a dangerous traffic collision accident on a highway due to driving asleep or inattentive driving.

FIG. 1 is an explanatory view showing a situation where a laser type radar 3 as a vehicular radar apparatus of this type is assembled on a and measures a distance D between an automobile 2 traveling forward in the same traffic lane. As shown in FIG. 1, the laser type radar 3 is provided with a head 3-1 having beam irradiating and receiving sections. A laser beam LS irradiated from the beam transmitting section is reflected by a reflector 4 such as, for example, a rear tail lamp on a rear side of the forward-moving automobile 2, and the reflected beam LR is received by the beam receiving section. The laser type radar 3 calculates a distance D on the basis of an irradiation timing of the laser beam LS and a reception timing of the reflected laser beam LR, and displays the calculated distance D on a display unit 3-2 mounted in front of the driver's seat of the truck 1 as shown in FIG. 2. The display unit 3-2 is provided with a distance displaying section 3-21 which displays in format the calculated distance D which changes momentarily.

When the truck 1 comes close to the automobile 2 and the distance D becomes shorter than a safety distance (first alarm distance), an alarm lamp 3-22 turns on and a first alarm phrase is generated at the same time. If the distance D becomes shorter than a certain distance which is shorter than the first alarm distance, e.g., shorter than a half of the first alarm distance, a second alarm is generated.

The above operation will be described with reference to FIG. 3.

FIG. 3A is a timing chart showing a condition where the distance D varies (shortens) over time t, FIG. 3B shows the timing of the generation of the first and second alarms, and FIG. 3C shows a condition of the alarm lamp 3-22. When the distance D becomes less than a first alarm distance D1 at a time t1, an acoustic phrase A (a chime melody) is first generated and then an acoustic phrase B (a warning signal) is generated repeatedly. Next, when the distance is further reduced to less than a second alarm distance D2 at time t2, an acoustic phrase C (the chime melody issued two times) is first generated as a second alarm and then an acoustic phrase D ("Danger!") is generated repeatedly.

While generating the second alarm phrase, the second alarm is paused if, for example, the distance D rapidly becomes larger than the safety distance D1 at a time t3 as shown in FIG. 3, that is, if the automobile 2 traveling forward in the same traffic lane rapidly changes the traffic lane. After that, if the distance D from a different automobile traveling forward in the same lane becomes lower than the safety distance D1 at a time t4, the first acoustic alarm is again generated and, further, the second acoustic alarm is again generated if the distance D becomes shorter than the second alarm distance D2 at a time t5.

According to the conventional laser type radar apparatus 3 thus operating, the first acoustic alarm is meaningless if a time period T1 between the time t3 when the second alarm is paused to the time t4 when the first alarm is again started is relatively short.

SUMMARY OF THE INVENTION

The present invention was made to eliminate the above difficulty accompanying the conventional laser type radar apparatus. Accordingly, an object of the invention is to provide a laser type radar apparatus which inhibits a first alarm at least within a predetermined time period from the pause of the second alarm.

According to the present invention, since the first alarm is not generated for at least four seconds after the pausing time of the last second alarm phrase, the first alarm phrase is not issued meaninglessly.

BRIEF DESCRIPTION OF THE DRAWINGS

FIG. 1 is an explanately view showing a situation where a laser type radar mounted on a truck measures a distance between an automobile traveling forward in the same lane;

FIG. 2 is a plan view showing a display unit of the laser type radar;

FIG. 3 is a timing chart of first and second alarms according to a conventional apparatus;

FIG. 4 is a timing chart of first and second alarms according to the apparatus of the present invention;

FIG. 5 is a block diagram showing essential components of the laser type radar embodying the present invention;

DESCRIPTION OF THE PREFERRED EMBODIMENTS

Preferred embodiments of a radar apparatus according to the present invention will now be described with reference to accompanying FIGS. 4 to 7.

FIG. 5 is a block diagram showing essential components of a control section of a laser radar apparatus embodying the present invention.

A control section 3—3 provided in a display unit 3-2 is provided with a CPU 3-31, a read only memory (ROM) 3-32 and a random access memory (RAM) 3-33. Various kinds of input information are supplied to the CPU 3-31 through an interface 3-34. The CPU 3-31 processes the input information and processed information is output through the interface 3-34.

Figure 6:
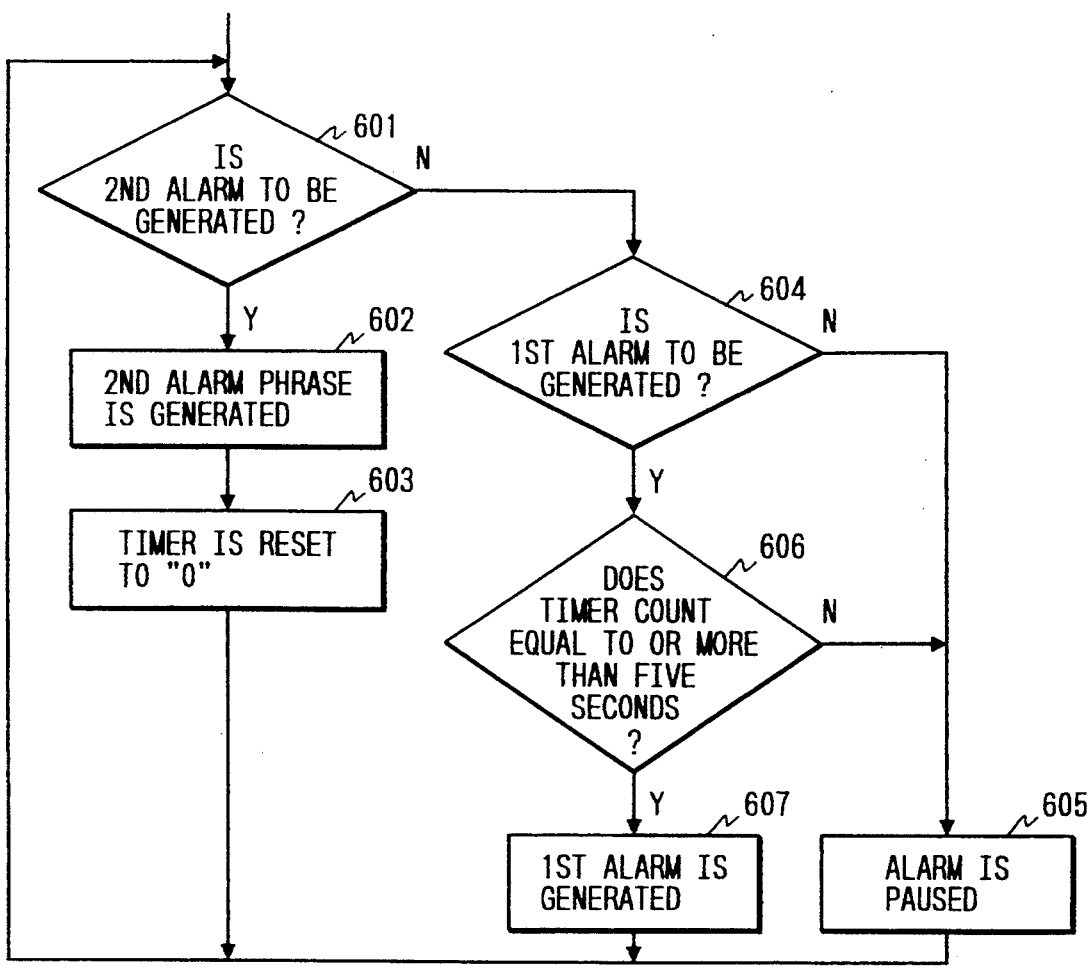
FIG. 6 is a flowchart showing the operation of the CPU in the laser type radar shown in FIG. 5.

The operation of the CPU 3-31 will be described with reference to FIG. 4 showing a timing chart and FIG. 6 showing a flowchart of the operation.

The CPU 3-31 calculates and monitors a distance D between the automobile on which the radar apparatus is assembled and an automobile traveling forward in the same direction, according to a program stored in the ROM 3-32. The CPU 3-31 judges if the automobile is in a condition where a second alarm signal should be generated (Step 601 in FIG. 6). If the distance D becomes less than a second alarm distance D2 at a time t2, the CPU judges the automobile is in the condition where the second alarm signal should be generated, and turns on an alarm lamp 3-22 and generates a second alarm phrase C at the same time in Step 602. A timer is reset (Step 603) at the starting time of generating the second alarm phrase C, and the operation returns to Step 601. Then the second alarm phrase D is generated at the Step 602, as in the conventional alarm apparatus mentioned above. The operation thus repeats the operation in which the timer is reset at every starting time of generating the alarm phrase D.

During the operation loop of the second alarm, when the distance D rapidly exceeds a safety distance D1 at a time t3 the CPU judges in Step 601 that the automobile is not in a condition where the second alarm is to be generated. After that, the operation goes to Step 604 where it is judged whether a first alarm should be generated. If it is judged the first alarm should not be generated the second alarm is paused (Step 605). In this condition, the timer continues counting time from the starting time t11 of generating the last alarm phrase D.

When the distance D again becomes less than the safety distance D1 at a time t4, the CPU 3-31 judges the first alarm is to be generated at Step 604. If it is judged that the first alarm should be generated the counted time ta at that time is checked in Step 306. Then, if the counted time ta is equal to or longer than five seconds the first alarm phrase is generated in Step 607 and, on the other hand, if the counted time ta is within five seconds the operation goes to Step 605 and the first alarm phrase is not generated.

As described above, according to the present invention, the first alarm is inhibited during a time period T from the time when the second alarm is paused at time t3 to the time when the time ta counted by the timer reaches five seconds. The time period T would actually be at least four seconds since the time period of the second alarm phrase D continues for one second in the present embodiment.

Accordingly, in the present invention, since the first alarm is not generated for at least four seconds after the pausing of the last second alarm phrase, the first alarm phrase is not generated meaninglessly.

Figure 7:
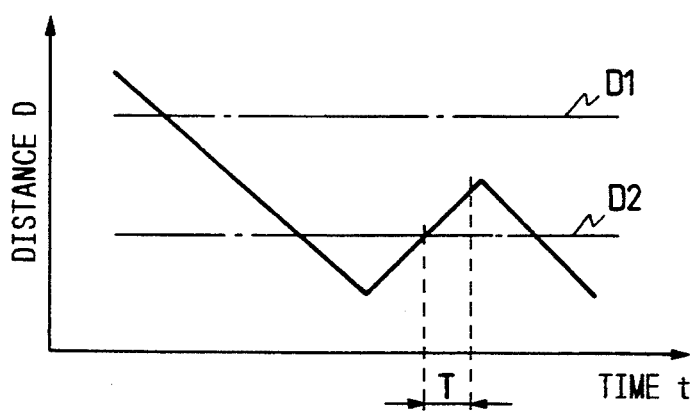
FIG. 7 is a graph showing the operation of the present invention in a case where a distance D smoothly increases to exceed a second alarm distance D2.

The embodiment described above pertains to the case where the distance D rapidly exceeds a safety distance D1. However, the invention is not limited thereto or thereby. For example, the first alarm may be inhibited during the time period T from the time when the second alarm is paused also in case where the distance D increases smoothly to exceed the second alarm distance D2 as shown in FIG. 7.

Further, in the embodiment described above, the timing for releasing the inhibiting of the first alarm is determined in accordance with the counted time ta from the starting time t11 of generating the last alarm phrase D. However, the timing for releasing the inhibiting of the first alarm may also be determined in accordance with a counted time from the finishing time of the last alarm phrase D, i.e., a time period counted from a paused time of the second alarm phrase.

Furthermore, the embodiment described above employs merely the first and second alarms. However, more kinds of alarms such as a third alarm, fourth alarm ... may be utilized. In these cases, the operation of the invention can be applied between the third and second alarms or between the fourth and third alarms.

Moreover, the above time period T in the embodiment, i.e., five seconds, is only one example and the invention is not limited thereto or thereby but may be varied if preferable for actual safety and drivers' demands.

As is apparent from the above description, the first alarm of the second occurrence and later is not generated at least within a predetermined time period from the time when the second alarm is paused. Accordingly, the first alarm phrase is not issued meaninglessly.

Many changes and arrangements are applicable without exceeding the concept of the present invention.

What is claimed is:

1. In a radar apparatus for use in a vehicle which measures a distance from an object located forward of the vehicle, generates a first alarm when the measured distance is shorter than a first alarm distance and a second alarm when the distance is shorter than a second alarm distance which is shorter than the first alarm distance, and pauses said second alarm in response to a predetermined condition, wherein the improvement comprises means for inhibiting generating of said first alarm for at least a predetermined period from a time when said second alarm is paused.

2. The radar apparatus of claim 1, wherein said predetermined period is determined from a starting time of the pausing of said second alarm.

3. The radar apparatus of claim 2, wherein said predetermined period is five seconds.

4. The radar apparatus of claim 1, wherein said radar apparatus is of a laser type comprising a laser beam irradiating section and a laser receiving section.

5. The radar apparatus of claim 4, further comprising a control section having an interface communicating with said laser beam irradiating and receiving sections, a central processing unit calculating said distance, and a ROM storing therein a program operatively associated with said central processing unit.

6. The radar apparatus of claim 1, wherein said first and second alarms comprise first and second acoustic alarm phrases, respectively.

7. The radar apparatus of claim 6, wherein said first alarm further comprises a viewable alarm.

8. The radar apparatus of claim 1, wherein said predetermined condition occurs when said measured distance rapidly exceeds said first distance.

9. The radar apparatus of claim 1, wherein said predetermined condition occurs when said measured distance changes smoothly to exceed said second distance.

10. A radar apparatus for a vehicle comprising:
alarm generating means for generating a first alarm when a distance from an object located forward of the vehicle is shorter than a first alarm distance and generating a second alarm when said distance is shorter than a second alarm distance; and
control means for calculating said distance and inhibiting said first alarm at least for a predetermined time period from the generation of said second alarm.

11. The radar apparatus of claim 10, wherein said predetermined period is determined from a starting time of pausing of said second alarm.

12. The radar apparatus of claim 11, wherein said predetermined period is five seconds.

13. The radar apparatus of claim 10, wherein said radar apparatus is of a laser type comprising a laser beam irradiating section and a laser receiving section.

14. The radar apparatus of claim 13, wherein said control means comprises an interface communicating with said laser beam irradiating and receiving sections, a central processing unit for driving said first and second alarms, and a ROM storing therein a program operatively associated with said central processing unit.

15. The radar apparatus of claim 10, wherein said first and second alarms comprise a first and second acoustic alarm phrases, respectively.

16. The radar apparatus of claim 15 wherein said first alarm further comprises a viewable alarm.

17. The radar apparatus of claim 16, further comprising a display unit for displaying said calculated distance and an alarm lamp indicating said viewable alarm.

18. The radar apparatus of claim 18, wherein said alarm generating means further generates third and fourth alarms.

* * * * *